United States Patent
Shih et al.

(10) Patent No.: US 9,996,134 B2
(45) Date of Patent: Jun. 12, 2018

(54) METHOD TO AVOID OVER-REBOOTING OF POWER SUPPLY DEVICE

(71) Applicant: ZIPPY TECHNOLOGY CORP., New Taipei (TW)

(72) Inventors: Tsun-Te Shih, New Taipei (TW); Yu-Yuan Chang, New Taipei (TW); Kuang-Lung Shih, New Taipei (TW); Heng-Chia Chang, New Taipei (TW)

(73) Assignee: ZIPPY TECHNOLOGY CORP., New Taipei (TW)

( * ) Notice: Subject to any disclaimer, the term of this patent is extended or adjusted under 35 U.S.C. 154(b) by 88 days.

(21) Appl. No.: 15/137,753

(22) Filed: Apr. 25, 2016

(65) Prior Publication Data

US 2017/0308140 A1 Oct. 26, 2017

(51) Int. Cl.
*G06F 1/28* (2006.01)
*G06F 1/26* (2006.01)

(52) U.S. Cl.
CPC ............ *G06F 1/28* (2013.01); *G06F 1/263* (2013.01)

(58) Field of Classification Search
CPC .................................. G06F 1/28; G06F 1/263
USPC .......................................... 713/300; 714/14
See application file for complete search history.

(56) References Cited

U.S. PATENT DOCUMENTS

| | | | |
|---|---|---|---|
| 6,345,369 B1 * | 2/2002 | Kitamorn | G06F 11/2268 702/132 |
| 6,373,671 B1 * | 4/2002 | Watanabe | H03K 17/0822 361/103 |
| 8,621,118 B1 * | 12/2013 | Nulkar | G06F 11/26 710/15 |
| 8,648,618 B1 * | 2/2014 | Shih | G01R 31/40 324/762.01 |
| 2004/0239512 A1 * | 12/2004 | Lomax, Jr. | H04M 19/001 340/638 |
| 2005/0223246 A1 * | 10/2005 | Bacchus | G06F 1/28 713/300 |
| 2010/0169695 A1 * | 7/2010 | Jurgilewicz | G06F 1/26 713/400 |

(Continued)

FOREIGN PATENT DOCUMENTS

| | | |
|---|---|---|
| TW | I271612 B | 1/2007 |
| TW | I305303 B | 1/2009 |

*Primary Examiner* — Kamini B Patel
(74) *Attorney, Agent, or Firm* — Muncy, Geissler, Olds & Lowe, P.C.

(57) ABSTRACT

A method to avoid over-rebooting of a power supply device comprises Step 1: receiving a power-good signal generated by a power supply device working normally; Step 2: checking whether the power-good signal is received; if no, demanding the power supply device to reboot; and Step 3: recording a count of rebootings of the power supply device; after the power supply device reboots, checking again whether the power-good signal is received; if yes, letting the power supply device keep on working and resetting the count of rebootings; if no, demanding the power supply device to reboot again, accumulating the count of rebootings, and checking whether the count of rebootings is greater than a limited count of rebootings; if yes, forbidding the power supply device to reboot. Thus is solved the problem that a power supply device whose abnormality cannot be removed by rebooting may damage the information device.

8 Claims, 5 Drawing Sheets

(56) References Cited

U.S. PATENT DOCUMENTS

| | | | | |
|---|---|---|---|---|
| 2012/0137114 A1* | 5/2012 | Tsai | ................... | G06F 11/1417 |
| | | | | 713/2 |
| 2013/0132752 A1* | 5/2013 | Chen | ................... | G06F 1/3206 |
| | | | | 713/323 |
| 2014/0347015 A1* | 11/2014 | Shih | ................... | H02J 7/0031 |
| | | | | 320/136 |
| 2015/0067312 A1* | 3/2015 | Lewandowski | ........... | G06F 1/26 |
| | | | | 713/2 |
| 2015/0355651 A1* | 12/2015 | Balakrishnan | ......... | G05B 15/02 |
| | | | | 700/299 |

* cited by examiner

METHOD TO AVOID OVER-REBOOTING OF POWER SUPPLY DEVICE

FIELD OF THE INVENTION

The present invention relates to a method to control a power supply device, particularly to a method to avoid over-rebooting of a power supply device.

BACKGROUND OF THE INVENTION

With advance of the operation capability of information devices, the demand to the working reliability of information devices also becomes stricter. Thus, some manufacturers proposed solutions disclosed in Taiwan Patents No. I271612 and No. I305303 to overcome operation abnormalities of microprocessors.

Whether an information device operates stably is not only dependent on the reliability of the microprocessor but also dependent on the reliability of the power supply device. Thus, some manufacturers program BIOS of an information device to instantly reboot the power supply device of the information device and eliminate the abnormality of the power supply device while the power supply device cannot supply power to the information device normally. However, the abnormality of a power supply device is not always owing to a temporary crash of the elements. The abnormality of a power supply device whose element is damaged by long term usage is unlikely to be solved by rebooting the power supply device. Therefore, the conventional technology, which instantly reboots a power supply device as soon as the power supply device malfunctions, cannot always solve the abnormality of the power supply device. The power supply device malfunctioning and rebooted repeatedly may supply abnormal power to the information device and lead to the damage of the information device.

SUMMARY OF THE INVENTION

The primary objective of the present invention is to solve the conventional problem that a power supply device whose abnormality cannot be removed by rebooting may damage the information device.

To achieve the abovementioned objective, the present invention proposes a method to avoid over-rebooting of a power supply device, which comprises Step 1: receiving a power-good signal from a power supply device operating normally;

Step 2: checking whether the power-good signal is received; if yes, letting the power supply device keep on working; if no, demanding the power supply device to reboot; and Step 3: recording a count of rebootings of the power supply device, and checking whether the power-good signal is received after the power supply device reboots; if yes, letting the power supply device keep on working, and resetting the count of rebootings; if no, demanding the power supply device to reboot once again, accumulating the count of rebootings, checking whether the count of rebootings exceeds a limited count of rebootings; if the count of rebootings exceeds the limited count of rebootings, forbidding the power supply device to reboot.

In one embodiment, the power supply device comprises a microcontroller; the microcontroller receives the power-good signal to determine whether the power supply device reboots; the limited count of rebootings is set inside the microcontroller; the microcontroller records the count of rebootings and compares the count of rebootings with the limited count of rebootings.

In one embodiment, in Step 3, while determining that the count of rebootings exceeds the limited count of rebootings, the microcontroller forbids generating a switching signal demanding the supply device to reboot.

In one embodiment, the microcontroller uses the count of generating the switching signals as the count of rebootings.

In one embodiment, Step 3 further comprises a sub-step: setting a limited time interval of rebooting, and checking whether the count of rebootings exceeds the limited count of rebootings within the limited time interval.

In one embodiment, the power supply device comprises a compulsory-close element; the compulsory-close element is connected with the microcontroller and operated manually by the user to send a compulsory-disable signal to the microcontroller to forbid the power supply device to reboot.

Compared with the convention technology, the present invention has the following characteristics:

While the power supply device cannot generate the power-good signal, the method of the present invention demands the power supply device to reboot and records the count of rebootings; while the count of rebootings exceeds the limited count of rebootings, the method of the present invention forbids the power supply device to reboot.

Therefore, the present invention can solve the conventional problem that a power supply device whose abnormality cannot be removed by rebooting may damage the information device.

DETAILED DESCRIPTION OF THE PREFERRED EMBODIMENTS

The technical contents of the present invention will be described in detail in cooperation with drawings below.

Figure 1:
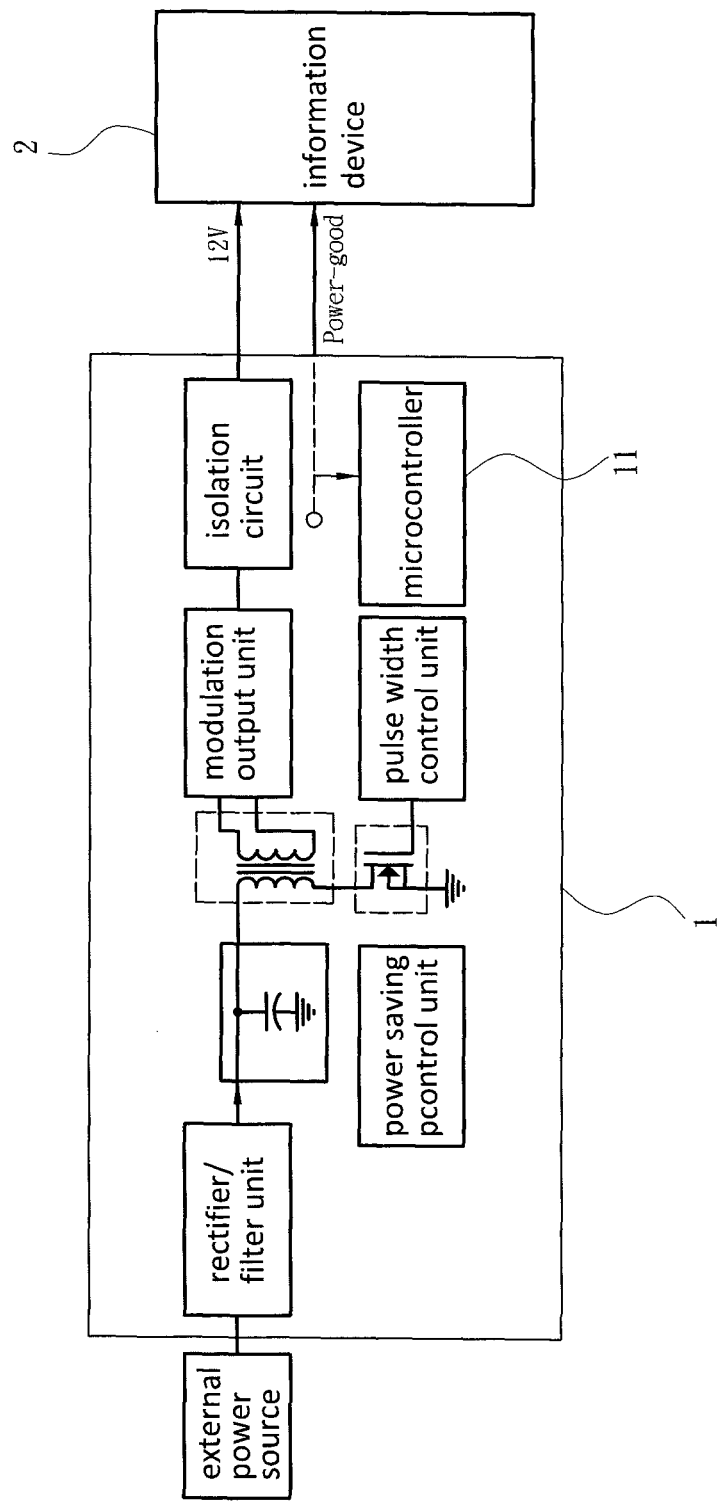
FIG. 1 is a block diagram schematically showing a power supply device according to one embodiment of the present invention.

The present invention proposes a method to avoid over-rebooting of a power supply device. Refer to FIG. 1. The power supply device 1 using the method of the present invention is a commercial power supply device, an industrial power supply or a redundant power device. However, the present invention does not limit that the method must be applied to the power supply devices mentioned above.

The power supply device 1 at least comprises a rectifier/filter unit connected with an external power source, a power factor correction unit connected with the rectifier/filter unit, a transformer connected with the power factor correction unit, a switch element connected with the transformer, and a power regulation unit connected with the transformer.

After being booted to supply power, the power supply device 1 not only provides a working power but also generates a power-good signal to an information device 2. Then, the information device 2 can learn the working state of the power supply device 1 from the power-good signal. In other words, the power supply device cannot generate the power-good signal while working abnormally. Further, the power supply device 1 also comprises a microcontroller 11.

Figure 2:
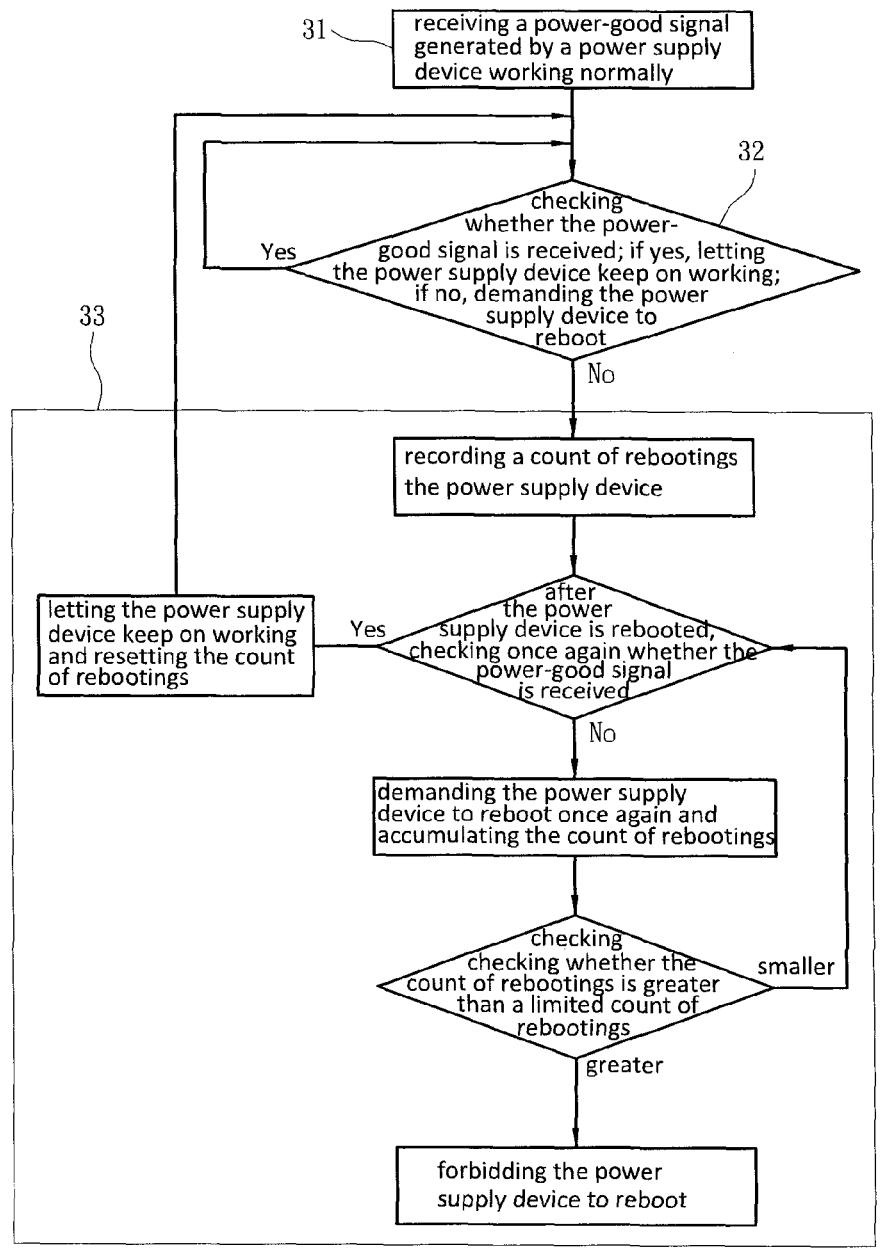
FIG. 2 is a flowchart of a method to avoid over-rebooting of a power supply device according to one embodiment of the present invention.

Refer to FIG. 2. The method of the present invention comprises Steps 1-3 (31-33).

In Step 1 (31), receive the power-good signal generated by the power supply device 1 working normally.

In Step 2 (32), check whether the power-good signal is received; if yes, let the power supply device 1 keep on working; if no, demand the power supply device 1 to reboot.

In Step 3 (33), record the count of rebootings of the power supply device 1; after the power supply device reboots, check once again whether the power-good signal is received; if yes, let the power supply device 1 keep on working and reset the count of rebootings; if no, demand the power supply device 1 to reboot once again, accumulate the count of rebootings, and check whether the count of rebootings is greater than a limited count of rebootings; if the count of rebootings is greater than the limited count of rebootings, forbid the power supply device 1 to reboot.

In detail, at the start of Step 1 (31), the microcontroller 11 receives a boot signal from the information device 2 and boots the power supply device 1 according to the boot signal. Then, the power supply device 1 supplies working power to the information device 2. While booted to operate and supply power, the power supply device 1 generates the power-good signal at the same time. Thus, the microcontroller 11 receives the power-good signal and learns the working state of the power supply device 1. Then, the process proceeds to Step 2 (32).

While the power supply device 1 is operating to supply power, the microcontroller 11 routinely checks whether the power-good signal is received. If receiving the power-good signal, the microcontroller 11 let the power supply device 1 keep on supplying power. If the microcontroller 11 does not receives the power-good signal, the microcontroller 11 demands the power supply device 1 to reboot. Then, the process proceeds to Step 3 (33). At this time, the microcontroller 11 has counted the rebooting of the power supply device 1 once. In one embodiment, at least one arithmetic logic unit of the microcontroller 11 is used to count the rebooting activities.

After the power supply device 1 reboots, the microcontroller 11 checks once again whether the power-good signal is received. If the microcontroller 11 receives the power-good signal, the microcontroller 11 lets the power supply device 1 keep on working and resets the count of rebootings. If the microcontroller 11 still cannot receive the power-good signal after rebooting, the microcontroller 11 demands the power supply device 1 to reboot once again and accumulates the count of rebootings to have a value of 2. At the same time, the microcontroller 11 checks whether the count of rebootings is greater than a limited count of rebootings, which is built in the microcontroller 11. If the count of rebootings is greater than the limited count of rebootings, the microcontroller 11 forbids the power supply device 1 to reboot. In one embodiment, the limited count of rebootings is 2; if the count of rebootings is not greater than the limited count of rebootings, the microcontroller 11 controls the power supply device 1 to reboot for the second time and checks whether the power-good signal is received; if the power-good signal is received, the microcontroller 11 lets the power supply device 1 keep on working; if the power-good signal is not received, the microcontroller 11 accumulates the count of rebootings to have a value of 3; at the same time, the microcontroller 11 compares the count of rebootings with the limited count of rebootings and finds that the count of rebootings is greater than the limited count of rebootings; thus, the microcontroller 11 forbids the power supply device 1 to reboot.

In one embodiment, the power supply device 1 is booted according to a switching signal generated by the microcontroller 11. In one embodiment, in Step 3 (33), while determining that the count of rebootings is greater than the limited count of rebootings, the microcontroller 11 forbids generating the switching signal demanding the power supply device 1 to reboot. Thus, the power supply device 1 would not reboot while the count of rebootings is greater than the limited count of rebootings. In one embodiment, the count of generating the switching signals is used as the count of rebootings.

Figure 3:
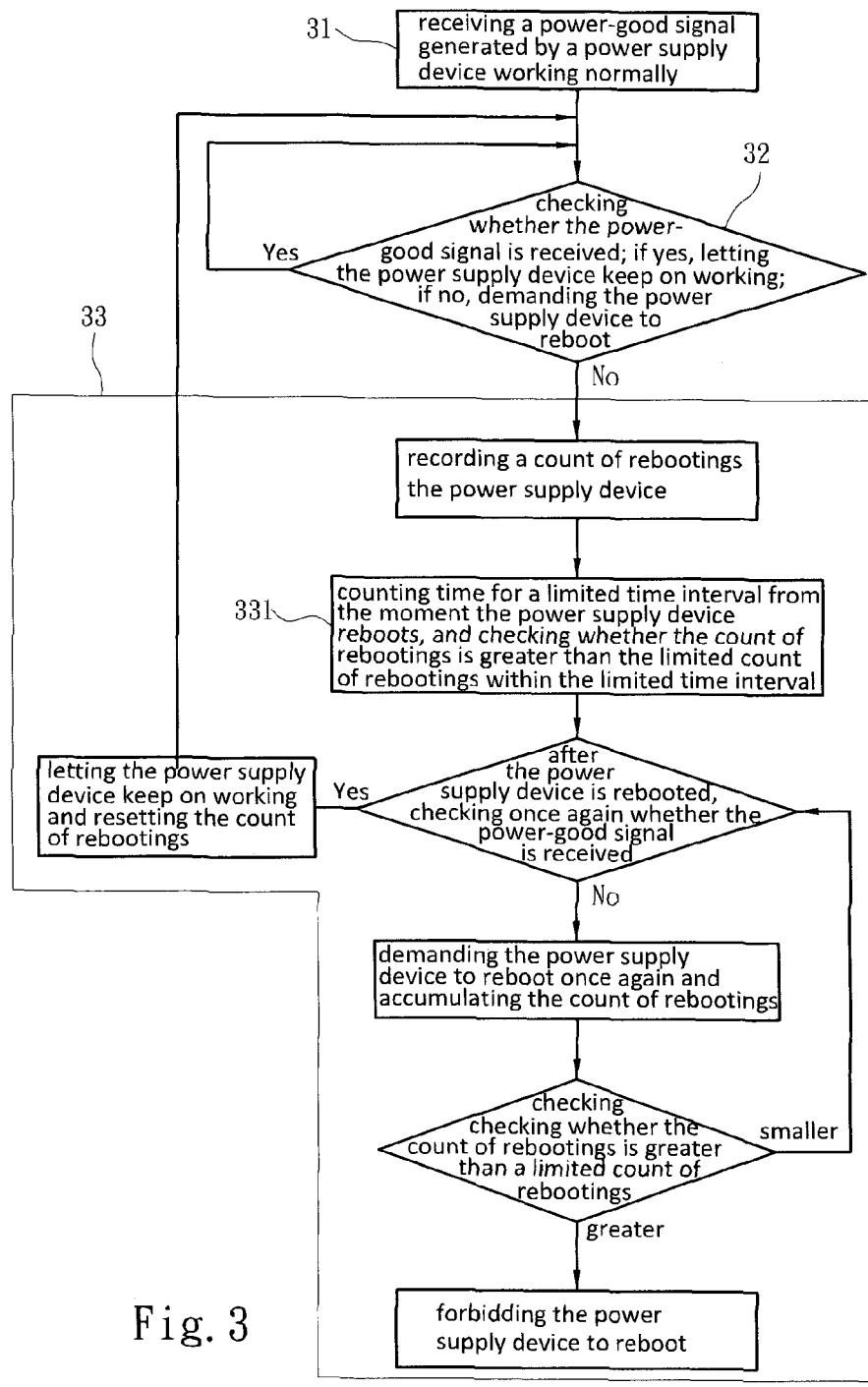
FIG. 3 is a flowchart of a method to avoid over-rebooting of a power supply device according to another embodiment of the present invention.

Refer to FIG. 3. In one embodiment, in order to more precisely verify whether the abnormality of the power supply device 1 cannot be removed via rebooting, Step 3 (33) further comprises Sub-Step 331: setting a limited time interval of rebooting and checking whether the count of rebootings is greater than the limited count of rebootings within the limited time interval. In one embodiment, the microcontroller 11 includes a timer module used to set the limited time interval. The limited time interval is adjusted according to practical requirement. For example, the limited time interval is set to be 3 minutes. The moment Step 3 (33) starts, the microcontroller 11 begins to count time and check whether the count of rebootings is greater than the limited count of rebootings within the limited time interval of rebooting. If the count of rebootings is greater than the limited count of rebootings within the limited time interval of rebooting, the microcontroller 11 forbids the power supply device 1 to reboot.

Figure 4:
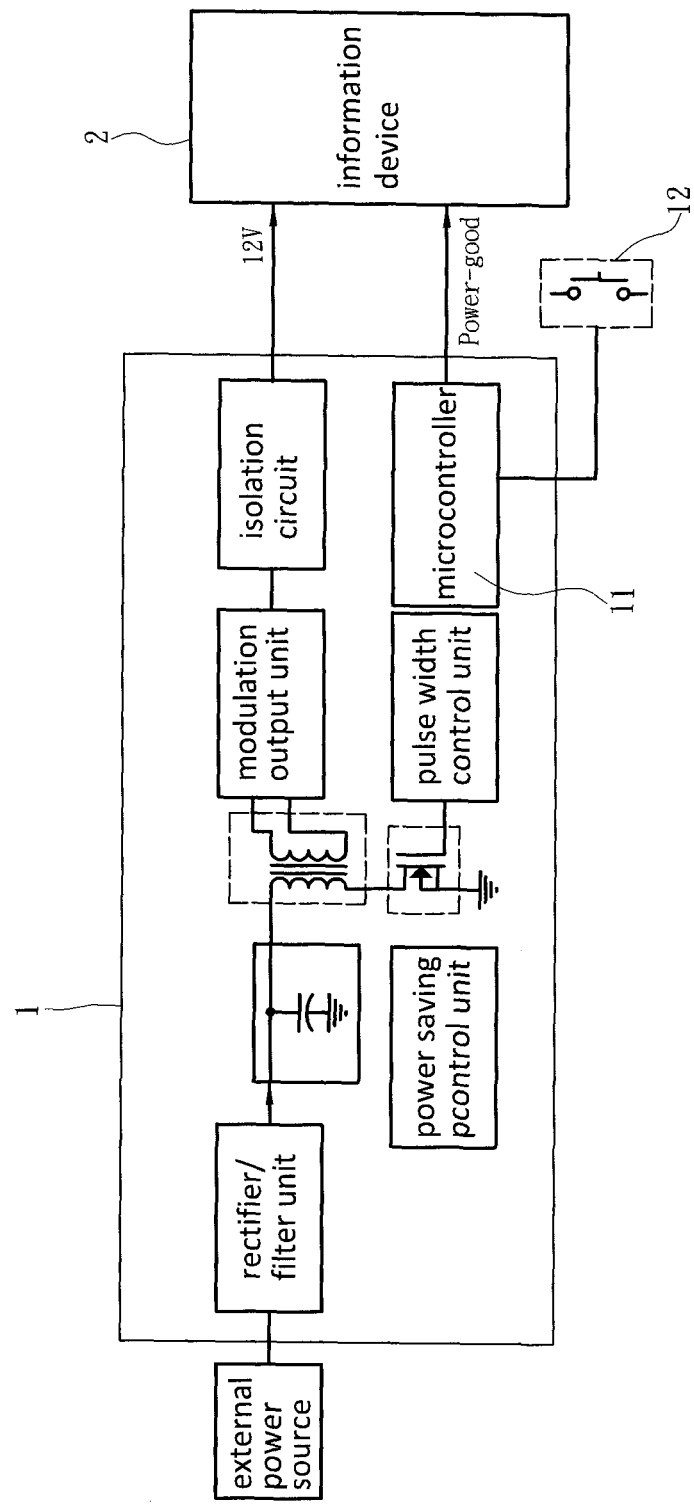
FIG. 4 is a block diagram schematically showing a power supply device according to another embodiment of the present invention.

Refer to FIG. 4. In one embodiment, the power supply device 1 further comprises a compulsory-close element 12. The compulsory-close element 12 is connected with the microcontroller 11 and operated manually by the user to output a compulsory-disable signal to the microcontroller 11. The compulsory-disable signal forbids the power supply device 1 to reboot. Thereby, the user can determine the work of the power supply device 1 according to the condition of rebooting. In one embodiment, the compulsory-close element 12 is a trigger switch.

Figure 5:
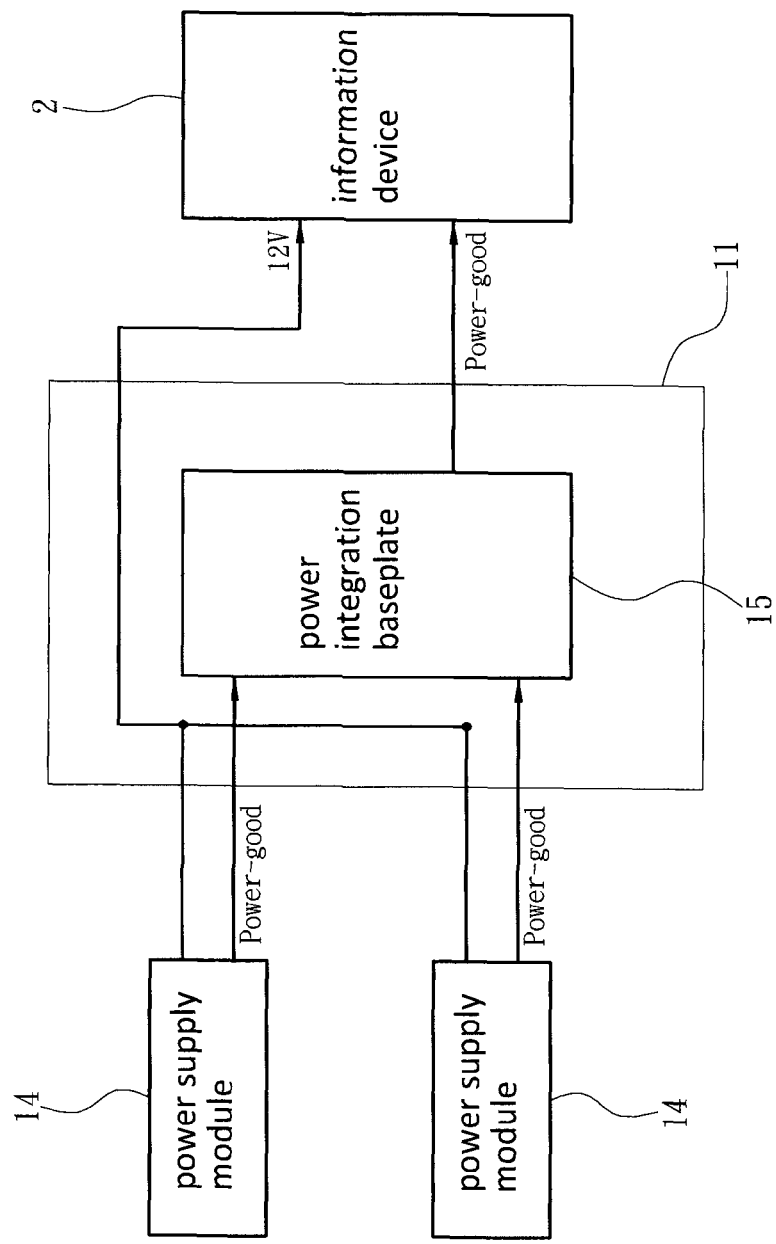
FIG. 5 is a block diagram schematically showing a power supply device according to yet another embodiment of the present invention.

Refer to FIG. 5. In one embodiment, the power supply device 1 is a redundant power supply device, which comprises a plurality of power supply modules 14 and a power integration baseplate 15. The microcontroller 11 is disposed in the power integration baseplate 15, receiving the power-good signals from the power supply modules 14 operating normally. The microcontroller 11 checks whether each power supply module 14 operates normally according to the power-good signal. The succeeding steps undertaken by the microcontroller 11 have been described above and will not repeat herein.

What is claimed is:

1. A method to avoid over-rebooting of power supply device, comprising
   Step 1: receiving a power-good signal generated by a power supply device working normally;
   Step 2: checking whether the power-good signal is received; if yes, letting the power supply device keep on working; if no, demanding the power supply device to reboot; and Step 3: recording a count of rebootings of the power supply device; after the power supply device reboots, checking once again whether the power-good signal is received; if yes, letting the power supply device keep on working and resetting the count of rebootings; if no, demanding the power supply device to reboot once again, accumulating the count of rebootings, and checking whether the count of rebootings is greater than a limited count of rebootings; if the count of rebootings is greater than the limited count of rebootings, forbidding the power supply device to reboot.

2. The method to avoid over-rebooting of power supply device according to claim 1, wherein the power supply device comprises a microcontroller, wherein the microcontroller receives the power-good signal to determine whether the power supply device reboots, and wherein the microcontroller records the count of rebootings and compares the count of rebootings with the limited count of rebootings, which is set in the microcontroller.

3. The method to avoid over-rebooting of power supply device according to claim 2, wherein in Step 3, while the microcontroller determines that the count of rebootings is greater than the limited count of rebootings, the microcontroller forbids generating a switching signal, which is for rebooting the power supply device.

4. The method to avoid over-rebooting of power supply device according to claim 3, wherein the microcontroller uses a count of generating the switching signals as the count of rebootings.

5. The method to avoid over-rebooting of power supply device according to claim 1, wherein Step 3 further comprises a sub-step: counting time for a limited time interval of rebooting from the moment the power supply device reboots, and checking whether the count of rebootings is greater than the limited count of rebootings within the limited time interval.

6. The method to avoid over-rebooting of power supply device according to claim 4, wherein Step 3 further comprises a sub-step: counting time for a limited time interval of rebooting from the moment the power supply device reboots, and checking whether the count of rebootings is greater than the limited count of rebootings within the limited time interval.

7. The method to avoid over-rebooting of power supply device according to claim 1, wherein the power supply device further comprises a compulsory-close element, and wherein the compulsory-close element is connected with the microcontroller and operated manually by a user to output a compulsory-disable signal to the microcontroller, and wherein the compulsory-disable signal forbids the power supply device to reboot.

8. The method to avoid over-rebooting of power supply device according to claim 4, wherein the power supply device further comprises a compulsory-close element, and wherein the compulsory-close element is connected with the microcontroller and operated manually by a user to output a compulsory-disable signal to the microcontroller, and wherein the compulsory-disable signal forbids the power supply device to reboot.

\* \* \* \* \*